Sept. 30, 1969 R. R. HOWLETT 3,469,380
MACHINES FOR CUTTING GRASS OR OTHER VEGETABLE MATTER
Filed June 20, 1966 8 Sheets-Sheet 1

INVENTOR:-
Rey R. Howlett,

BY
Wolfe, Hubbard, Voit and Osann,
ATTORNEYS

Sept. 30, 1969 R. R. HOWLETT 3,469,380
MACHINES FOR CUTTING GRASS OR OTHER VEGETABLE MATTER
Filed June 20, 1966 8 Sheets-Sheet 4

INVENTOR:
Rex R. Howlett,
By Wolfe, Hubbard, Voit & Osann
ATTORNEYS

Sept. 30, 1969 R. R. HOWLETT 3,469,380
MACHINES FOR CUTTING GRASS OR OTHER VEGETABLE MATTER
Filed June 20, 1966 8 Sheets-Sheet 6
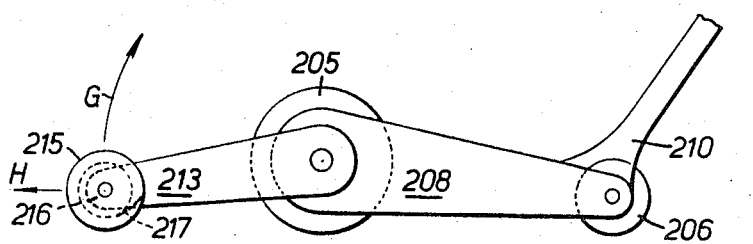
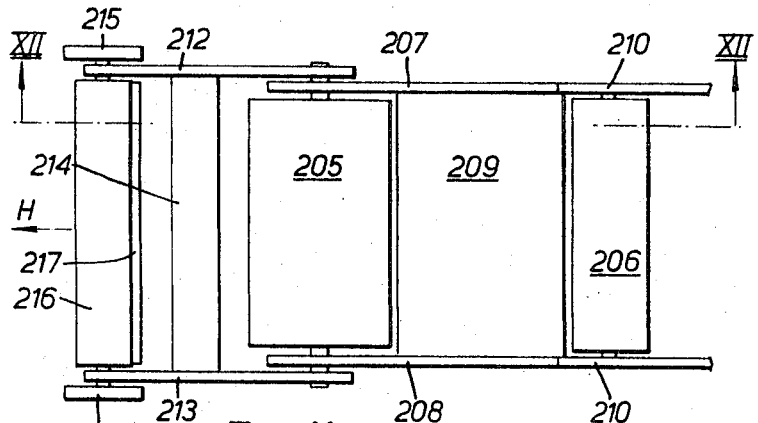
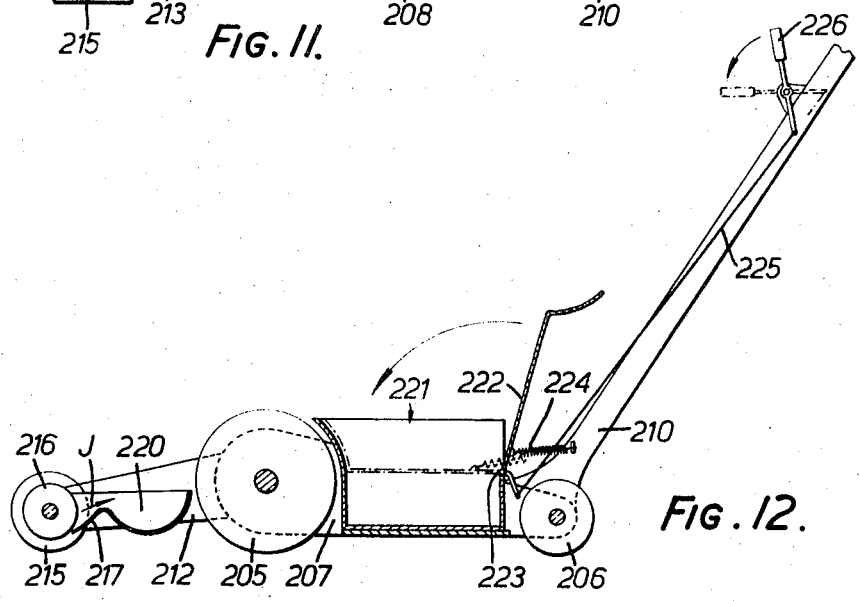

Sept. 30, 1969  R. R. HOWLETT  3,469,380
MACHINES FOR CUTTING GRASS OR OTHER VEGETABLE MATTER
Filed June 20, 1966  8 Sheets-Sheet 7

Sept. 30, 1969  R. R. HOWLETT  3,469,380
MACHINES FOR CUTTING GRASS OR OTHER VEGETABLE MATTER
Filed June 20, 1966  8 Sheets-Sheet 8

INVENTOR
Rex R. Howlett,
Wolfe, Hubbard, Voit & Osann,
ATTORNEYS

ABSTRACT OF THE DISCLOSURE

United States Patent Office 3,469,380
Patented Sept. 30, 1969

3,469,380
MACHINES FOR CUTTING GRASS OR
OTHER VEGETABLE MATTER
Rex. R. Howlett, Henley-on-Thames, England, assignor to Wilkinson Sword Limited, London, England, a British company
Filed June 20, 1966, Ser. No. 558,991
Claims priority, application Great Britain, Apr. 6, 1966, 15,429/66
Int. Cl. A01d 35/22, 53/06
U.S. Cl. 56—202
2 Claims

ABSTRACT OF THE DISCLOSURE

The invention relates to a machine for cutting grass and like vegetable matter, comprising a frame, ground engaging support means mounted in the frame, a cutting member rotatably mounted in the frame for cutting grass and like vegetable matter as the machine moves in a forward direction, a first open box mounted on the frame and moveable between a first position adjacent to the cutting member, in which it receives cut grass and like vegetable matter cut by the cutting member, and a second position, and a second open box mounted on the frame and positioned so that cut grass and like vegetable matter in the said first box falls therefrom into the second box when the first box is in the said second position.

---

The invention relates to machines for cutting grass and like vegetable matter, such as lawn mowers, for example:

According to one aspect of the invention, there is provided a machine for cutting grass and like vegetable matter, comprising a cutting member for cutting grass and like vegetable matter as the machine is moved in a forward direction, and ground-engaging means mounted rearward of the said cutting member, said ground-engaging means being sufficient to support the machine.

According to another aspect of the invention, there is provided a machine for cutting grass and like vegetable matter, comprising a frame, a ground-engaging rear roller rotatably mounted in the frame, a rotatable cutting member mounted in the frame for rotation as the machine is moved in a forward direction and for cutting grass and like vegetable matter, the rotatable cutting member being mounted forward of the ground-engaging rear roller, and further ground-engaging support means mounted in the frame and rotatable about an axis rearward of the rotatable cutting member and forward of the said rear roller, the said axis of the further ground-engaging support means being parallel to the axis of the said rear roller.

According to yet another aspect of the invention, there is provided a machine for cutting grass and like vegetable matter of the type including a cutting cylinder rotatable in cutting relationship with a fixed cutting blade, including an endless band mounted in front of the cutting cylinder and presenting an inclined surface extending substantially from one end of the cutting cylinder to the other and parallel to the axis of the cutting cylinder, the uppermost edge of the surface being in front of the lowermost edge, and means for moving the endless band as the cutting cylinder rotates whereby the said surface moves in the direction from the uppermost edge to the lowermost edge for engaging and bending over grass and like vegetable matter taller than a predetermined level and allowing it to spring up inside the cutting cylinder.

According to a still further aspect of the invention, there is provided a lawn mower of the type incorporating main roller means, smaller diameter roller means mounted in front of the main roller means, and a cutting cylinder rotatable in cutting relationship with a fixed cutting blade, in which the cutting cylinder is mounted in front of both said roller means.

According to another aspect of the invention, there is provided a lawn mower of the type having a main roller and a cutting cylinder rotatable in cutting relationship with a fixed blade, including rotatable means freely rotatably mounted in the said frame and drivingly connected both to the main roller and to the cutting cylinder for rotating the cutting cylinder when the mower is pushed along the ground, the frame being adapted to receive a removable motor assembly arranged to engage the said rotatable means whereby to drive both the main roller and the cutting cylinder.

According to a further aspect of the invention, there is provided a machine for cutting grass and like vegetable matter, including a cutting member rotatable, as the machine moves, for cutting the grass and like vegetable matter, and including means responsive to the force exerted on the said cutting member by the grass and like vegetable matter being cut for raising the cutting member when the said force exceeds a predetermined value.

According to yet another aspect of the invention, there is provided a lawn mower, including rotatable ground-engaging support means, and two cutting cylinders each rotatable in cutting relationship with a stationary cutting blade for cutting grass as the mower moves, one said cutting cylinder being adapted for cutting longer grass than the other.

According to yet a further aspect of the invention, there is provided a lawn mower having two relatively movable portions, one said portion rotatably supporting ground-engaging support means including a roller, and the other said portion rotatably supporting a cutting cylinder and ground-engaging support means, the cutting cylinder being arranged for rotation, as the mower moves, for cutting grass, and the two said portions of the frame being so constrained for relative movement that the axis of the cutting cylinder remains substantially parallel with the axis of the said roller.

According to still another aspect of the invention, there is provided a lawn mower, including a box for receiving grass cuttings, said box having a hinged side or lid including a portion adapted to enter the box when the side or lid is depressed, so as to compress grass cuttings in the box.

Several lawn mowers embodying the invention will now be described by way of example and with reference to the accompanying drawings in which FIGURE 1 is a diagrammatic side elevation of a lawn mower embodying the invention.

FIGURE 10 is a diagrammatic side elevational of another lawn mower embodying the invention;

FIGURE 11 is a plan view of the mower of FIGURE 10;

FIGURE 12 is a cross-section on the line XII—XII of FIGURE 11 and shows, in addition, a grass-collecting arrangement for the mower;

The lawn mowers of FIGURES 1 to 4 have a frame comprising two side members 4, to which a handle 4A is attached and which may be joined by cross-rods, not shown.

Figure 1:
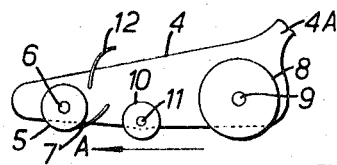

In FIGURE 1, only one side member 4 is shown, the other having been removed to show a cutting cylinder 5 mounted so as to rotate about an axis 6. The cutting cylinder 5 engages a stationary cutting blade 7 and is connected to be rotated in known manner by a ground-engaging main roller 8 which is rotatably mounted in the mower frame and rolls on the ground in use about an axis 9. A ground-engaging support roller 10, rotatable about an axis 11, is mounted in the mower frame between the cutting cylinder 5 and the main roller 8. The rollers 8 and 10 are the only ground-engaging support means which the mower has. The arrow A shows the normal, forward, direction of movement of the mower. Because the support roller 10 is placed behind the cutting cylinder 5, the grass is not flattened before being cut by the cutting cylinder. The grass can therefore be cut more satisfactorily than is the case when the support roller 10 is placed in front of the cutting cylinder 5.

A deflector plate 12 may be provided if desired in order to deflect the cut grass backwards into a grass box (not shown) mounted behind the cutting cylinder and over the main roller 8. The cutting cylinder is therefore the foremost part of the mower and this is advantageous when the mower is being manoeuvred in confined spaces or close to an obstruction.

Figure 2:
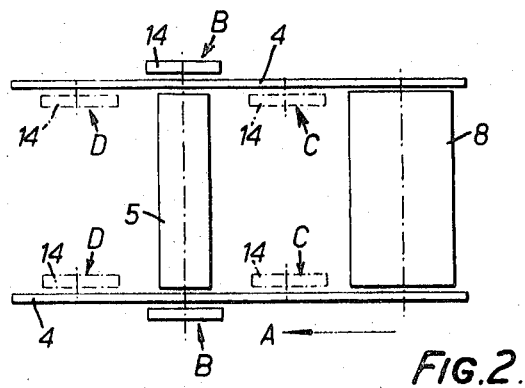
FIGURE 2 is a diagrammatic plan view of another lawn mower embodying the invention.

In FIGURE 2, parts performing similar functions to parts in FIGURE 1 are similarly referenced. The mower shown in FIGURE 2 has a cutting cylinder 5 rotatably mounted in the mower frame and connected to be driven in known manner by a ground-engaging main roller 8 which is also mounted to rotate in the frame. The arrow A shows the normal, forward, direction of movement of the mower in use. The mower also has ground-engaging supporting side wheels 14. These wheels are rotatably mountable on the frame in any one of three positions referenced B, C and D. In position B, they are coaxial with the cutting cylinder 5. When the wheels are in either position C or position D, the mower can be used close to the flower bed or gulley. The side wheels may be mounted on spigots on the frame and their position may be altered by unbolting them from one pair of spigots and bolting them onto another pair of spigots. In another arrangement, the wheels may be mounted on a linkage which enables their position to be changed by operation of a simple lever system. The mower may, however, be constructed with the side wheels 14 permanently mounted on the frame in one or other of the positions C and D.

Figure 3:
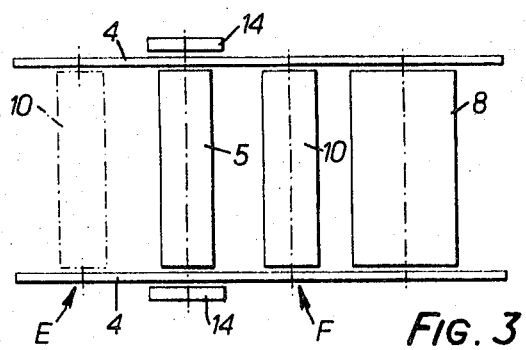
FIGURE 3 is a diagrammatic plan view of a further lawn mower embodying the invention.
Figure 4:
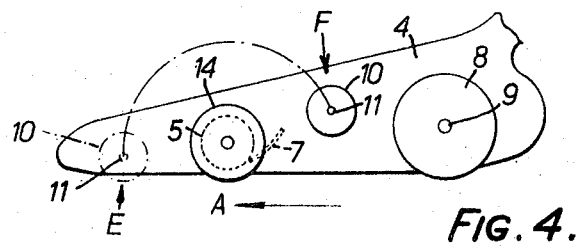
FIGURE 4 is a diagrammatic side elevation of the lawn mower of FIGURE 3.

In FIGURES 3 and 4, parts performing similar functions to parts in FIGURES 1 and 2 are similarly referenced. As before, the mower has a cutting cylinder 5 rotatably mounted in the frame and connected to be driven in known manner by a ground-engaging main roller 8 also rotatably mounted in the frames. The arrow A shows the normal, forward, direction of movement of the mower in use. The mower has a pair of ground-engaging side wheels 14 which are rotatably mounted on the frame coaxially with the cutting cylinder 5. The mower also has a support roller 10 which is rotatably mounted on a linkage attached to the frame of the mower so that it can be swung down into a position E in which it engages the ground and supports the cutting cylinder, and a position F in which it is swung clear of the ground so that the side wheels 14 support the cutting cylinder. In use, the support roller 10 is normally left in position F so that the cutting cylinder is supported by the wide wheels 14 and is the foremost part of the mower; the support roller 10, when in position F, does not flatten the grass before it is cut by the cutting cylinder. When however, it is desired to cut grass near a flower bed or gulley into which one or other of the wheels 14 might drop, the support roller 10 is temporarily swung down into the position E to support the cutting cylinder 5.

The mowers of FIGURES 1 to 4 may be manually or mechanically or electrically propelled. If the mower is electrically propelled, it may conveniently be battery powered. The battery may be stowed in a compartment mounted on the mower frame. In another arrangement, the battery is mounted in a separate trailer attached to the mower by a single quickly removable pin. This pin can be removed for simplifying the problem of moving the mower over steps or similar obstacles. The weight of the battery can be used to assist the lawn rolling operation if a rotatable roller is placed underneath the battery on the trailer. The roller on the lawn mower itself can then be much lighter. The mower could be provided with a transformer and rectifier assembly for powering the mower in the event of battery failure and/or for battery charging.

It will be appreciated that FIGURES 1 to 4 are essentially diagrammatic. A mower embodying some of the features shown diagrammatically in FIGURES 1 to 4 will now be described in detail with reference to FIGURES 5 to 9.

The mower (FIGURES 5, 6 and 7) comprises a main frame having a pair of frame members 20 and 22 which are joined by cross members 24 disposed centrally of the mower. The frame members 20 and 22 rotatably support, at their rear ends, the main roller assembly 26 comprising two separate rollers 27 and 28 which are drivingly connected together, and to a shaft 29, by a conventional differential mechanism which will be explained in greater detail with reference to FIGURE 9 below. The shaft 29 extends through the frame members 20 and 22 and is supported in bearings 30. One end of the shaft 29 is extended to receive a pulley 31 which is fast with the shaft.

A pair of handles are pivotally supported at the rear ends of the frame members 20 and 22 and held in position by nuts 33, stops 34 being provided to limit the range of possible movement of the handles.

The front end of the mower frame is supported by front roller assembly 35 comprising a pair of ground-engaging rollers 36 and 37 which are rotatably supported on a shaft 38 extending between the frame members 20 and 22. A pair of side wheels 39 and 40 are respectively supported on the frame members 20 and 22 in front of the rollers 36 and 37. The side wheels 39 and 40 are so positioned on the frame members 20 and 22 that they are not normally in contact with the ground, the whole weight of the mower being supported by the rollers 27 and 28 of the rear roller assembly 26, and the rollers 36 and 37 of the front roller assembly 35. Only when there is a sharp rise in the ground in front of the mower do the side wheels 39 and 40 come into contact with the ground and lift the front of the mower.

At the front end of the frame members 20 and 22, a sub-frame rotatably supporting a cutting cylinder 41 is mounted. The sub-frame comprises a pair of end plates 42 and 43 positioned at opposite ends of the cutting cylinder 41; the cutting cylinder 41 is shown broken away to illustrate a shaft 44 whose two ends are rotatably supported in the end plates 42, 43 and which is centrally positioned within and co-axial with the cutting cylinder 41.

The cutting cylinder 41 is of known form and comprises a plurality of twisted blades 45 located around the surface of an imaginary cylinder centered on the shaft 44. A stationary cutting blade 46 extends between the end plates 42 and 43, beneath the cutting cylinder 41. The cutting blade 46 is supported at each of its ends by a bracket 47 (FIGURE 6) which in turn is flexibly supported on the appropriate one of the end plates 42, 43 by a spring member 48. Each spring member 48 is in the form of a vertically arranged strip which is attached to the bracket 47 by two bolts 47a and 47b; at its upper end, each strip 48 has a flanged portion extending at right angles out of the plane of the strip, which flange is fixed to the respective end plate 42, 43 by bolts 48a and 48b and the inherent spring in the strips 48 urges the blade 46 into contact with the cutting cylinder 41. At each end of the blade 46, a vertical rod 49 is provided which threadably engages a nut 50 fixed to the appropriate end plate 42, 43; the lower end of each rod passes freely through the blade 46 and terminates in a circlip while its upper end terminates in a knurled knob 50. The blade 46 may therefore be raised and lowered with respect to the cutting cylinder 41 by rotation of the knurled knob 51, the raising and lowering being accommodated by flexure of the spring member strips 48.

Each end plate 42, 43, has converging upper and lower edges (see FIGURE 6) and, at the convergent portion so formed, the end plates are respectively pivoted to frame members 20 and 22; the end plate 42 is pivoted to the frame member 20 by means of a rod 52 (FIGURE 7) which is fastened to the frame member by a nut 54, while the end plate 43 is pivoted to the frame member 22 by a rod 56 which is fastened to the frame member 22 by a nut 58. As the end plates 42 and 43 support the shaft 44 of the cutting cylinder 41, it will be apparent that the height of the cutting cylinder above the ground may be varied by pivoting the end plates 42 and 43 on the rods 52 and 56. In order to locate the end plates 42 and 43 so as to hold the cutting cylinder in a particular position in relation to the ground, an adjustment rod 60 (FIGURE 7) is provided. This adjustment rod extends between the two end plates 42 and 43, below the cutting cylinder 41, and is freely longitudinally slideable in holes respectively positioned in rearwardly and downwardly extending portions of the end plates (FIGURE 6). The frame members 20 and 22 are each provided with slots 62 (see FIGURE 5) which are positioned on arcs centered on the axis of the rods 52 and 56; each slot comprises four holes 64 joined by narrower portions 66. The rod 60 extends outwardly from each end plate 42, 43 and its ends respectively protrude into the slots 62. The diameter of the rod 60 is, except for two neck portions 68 (FIGURE 7) such as to be a close fit in each hole 64 in the slot 62. The neck portions 68 (see FIGURE 7) are so positioned that, when the rod is moved longitudinally towards the frame member 22, the neck portions become respectively aligned with the frame members 20 and 22. The diameter of the neck portions 68 is less than the width of the narrow portions 66 of the slots 62 so that, in this position of the rod 60, the end plates 42 and 43 can be freely pivoted about the pivot rods 52 and 56 to adjust the position of the cutting cylinder 41, the neck portions 68 moving freely along the slots 62. When the cutting cylinder 41 has been moved to the desired position, which must be such that the rod 60 is aligned with a hole 64 in each slot 62, the rod 60 is then moved longitudinally towards the frame member 20 so that its neck portions 68 move out of alignment with the end plates 42, 43, larger diameter portions of the rod entering the aligned holes 66 to prevent further pivotable movement of the end plates 42, 43.

Figure 7:
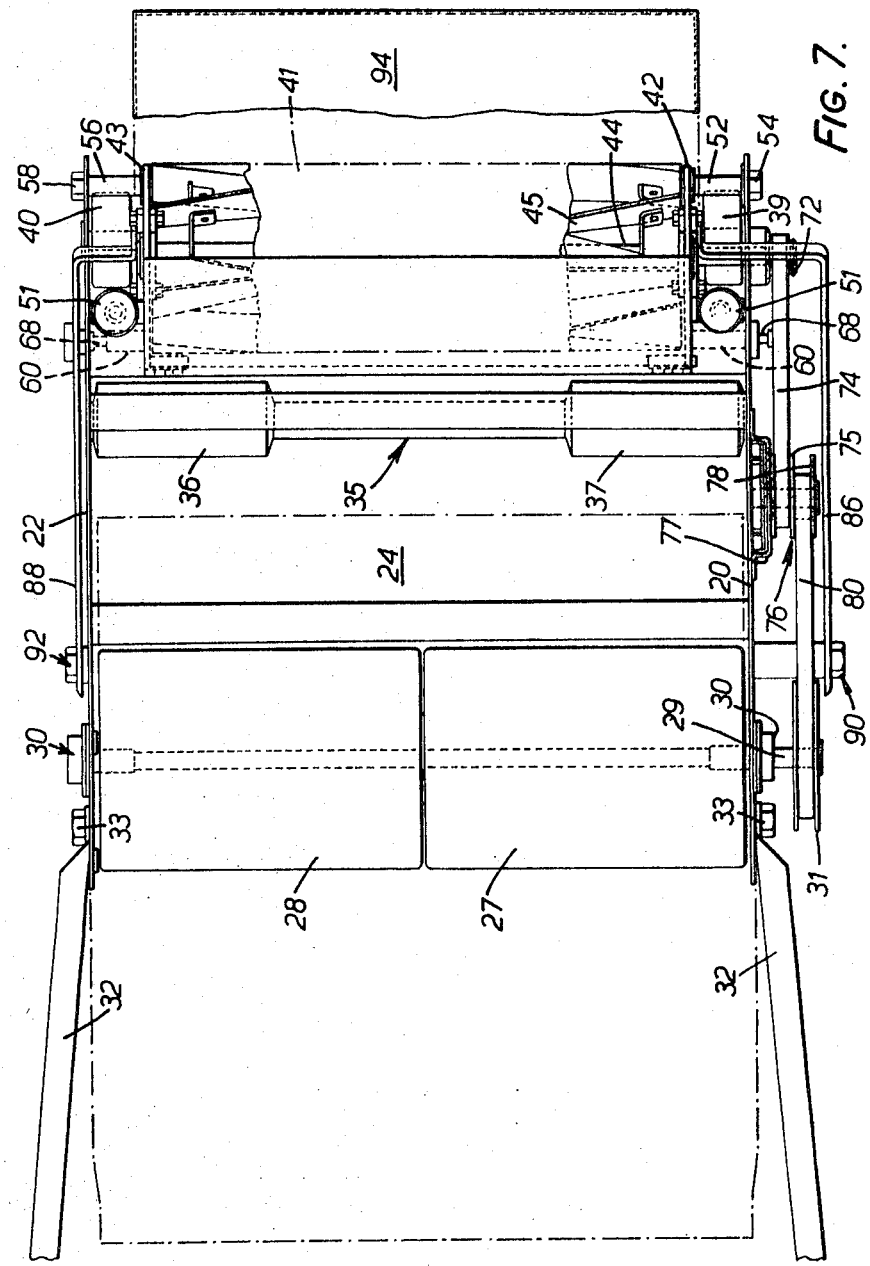
FIGURE 7 is a plan view of the mower of FIGURES 5 and 6.

The extreme front end of the frame member 20 is shaped to provide a re-entrant slot 70 (FIGURE 5), and the shaft 44 of the cutting cylinder 41 extends to protrude through this slot 70 and is fast with a pulley 72 (FIGURE 7). The pulley 72 is drivingly connected by means of a V-belt 74 to one section 75 of a double-pulley 76 which is rotatably mounted on a bracket 77 disposed at the centre of the frame member 20. The other section 78 of the double-pulley 76 is drivingly connected by a further V-belt 80 to the pulley 31 fixed to the shaft 29 of the rear roller assembly 26. In this way, the rear roller assembly 26 is drivingly connected to the cutting cylinder 41 so that the latter rotates when the mower is moved in a forward direction.

A pair of side arms 86 and 88 are respectively pivoted to the frame members 20 and 22 by pivots 90 and 92 (FIGURE 7) and are rigidly attached to a grass hopper 94 which extends across the mower. The grass hopper 94 rests on the front end of the frame members 20 and 22 (FIGURE 5) and has an open portion or slot 96 extending across and above the cutting cylinder 41. A curved grass plate 98 (FIGURE 6) is mounted between the end plates 42 and 43. The rear ends of the mower frame support a large open-topped grass box 100 (omitted in FIGURE 7) which is located on the frame member 20 by means of slotted brackets 102 and 104 which engage pins 106 on the frame member, and is similarly located on the frame member 22.

In use, grass is cut by the cutting cylinder 41 as it rotates in engagement with the fixed cutting blade 46, and grass cuttings are directed by the grass plate 98 into the hopper 94 through the open slot 96 therein. When the grass hopper 94 is full of cuttings, the hopper is raised, by pivoting the side arms 86 and 88 about their pivots 90 and 92, until it is positioned over the open top of the grass box 100 whereupon the cuttings in the hopper 94 fall out through the open slot 96 into the grass box 100. The grass hopper 94 can then be lowered back into the position illustrated in FIGURE 5. The grass box 100 can be simply lifted off the mower frame, when full, to enable it to be emptied. By providing this arrangement of the main grass box 100 and a smaller pivoted grass hopper 94, the amount of grass which can be cut before mowing must be temporarily stopped to remove the cuttings is greatly increased. The arrangement permits an enlarged grass box, that is, the box 100, to be used since this large box is positioned over the rear roller assembly 26 where it does not adversely affect the stability of the mower or the cutting action. In fact, the weight of the grass box, particularly when full, aids the rolling action of the rear roller assembly 26. It would not be practicable to mount such a large box as the grass box 100 in the conventional position, that is, adjacent to the cutting cylinder 41. Even if a grass box of the size of the box 100 were mounted close to the cutting cylinder 41 so as to receive grass cuttings directly, its effective capacity would not be so great since it would have to have an open side to receive the grass cuttings. The effective capacity of such a box is limited by the fact that the grass cuttings tend to slide out of the open side as the box fills up. The box 100 is illustrated, on the other hand, has closed sides and an open top which is the optimum arrangement for greatest grass-carrying capacity.

Linkage may be provided to enable the mower operator to raise and lower the grass hopper 94 from his normal operating position. Such linkage may take the form of a cord and cable 94a attached to a lever 94b pivotally mounted on the handles 32.

The positioning of the roller assembly 35 behind the cutting cylinder 41, instead of in front of the cutting cylinder 41, provides more satisfactory grass cutting since grass to be cut is not flattened by the roller assembly 35 before it is reached by the cutting cylinder 41. The roller assembly 35 is positioned so as to take the weight of the front of the mower in normal conditions; it will, for example, support all the weight of the front of the mower when the mower is being used close to an edge or gully into which one of the side wheels 39, 40 would fall in the absence of the roller assembly 35. The side wheels 39, 40 are provided so as to lift the front of the mower in the event of a sudden bump or rise in the ground being encountered, thus preventing slicing of the ground by the cutting cylinder 41. It will therefore be seen that the combination of the side wheels 39 and 40, and the roller assembly 35, the latter being positioned rearwardly of the cutting cylinder 41, eliminates the flattening of the grass before it is cut which occurs in mowers in which a roller is positioned in front of the cutting cylinder, and at the same time permits the mower to be used close to, or partially overhanging, an edge or gulley, as well as substantially preventing slicing of bumps or ridges in the ground by the cutting cylinder or stationary cutting blade.

The cutting cylinder 41 and stationary cutting blade 46 may be replaced by a rotary blade assembly rotatable about a substantially vertical axis.

The mounting of the cutting cylinder 41 in the subframe comprising the end plates 42, 43, enables cylinder to be easily removed for adjustment or sharpening, for example, and also enables it to be easily replaced by other lawn-care devices such as arrangements for producing aerating holes in the ground.

The particular construction of the mower provides a substantial space between the main roller assembly 26 and the cutting cylinder 41. According to a feature of the invention, this space is adapted to receive a removable powerpack, incorporating an electric motor or internal combustion engine, for example, which is carried on a tray which locates on the cross members 24, so as to be located in driving engagement with the double-pulley 76, thus converting the mower from hand-operation to power operation. The feature permits standardisation of the mower construction, that is, the mower is basically the same whether it is to be used as a hand-operated mower or as a power-operated mower, thus simplifying production. The choice of the type of power unit can be left to the customer who, in addition, can buy the basic mower initially and the power unit later, thus reducing the immediate outlay. The mower can be provided with a removable cover 103 (FIGURE 5) to protect the power unit when in position, and also to protect the central portion of the mower when the power-pack is not in position.

Figure 5:
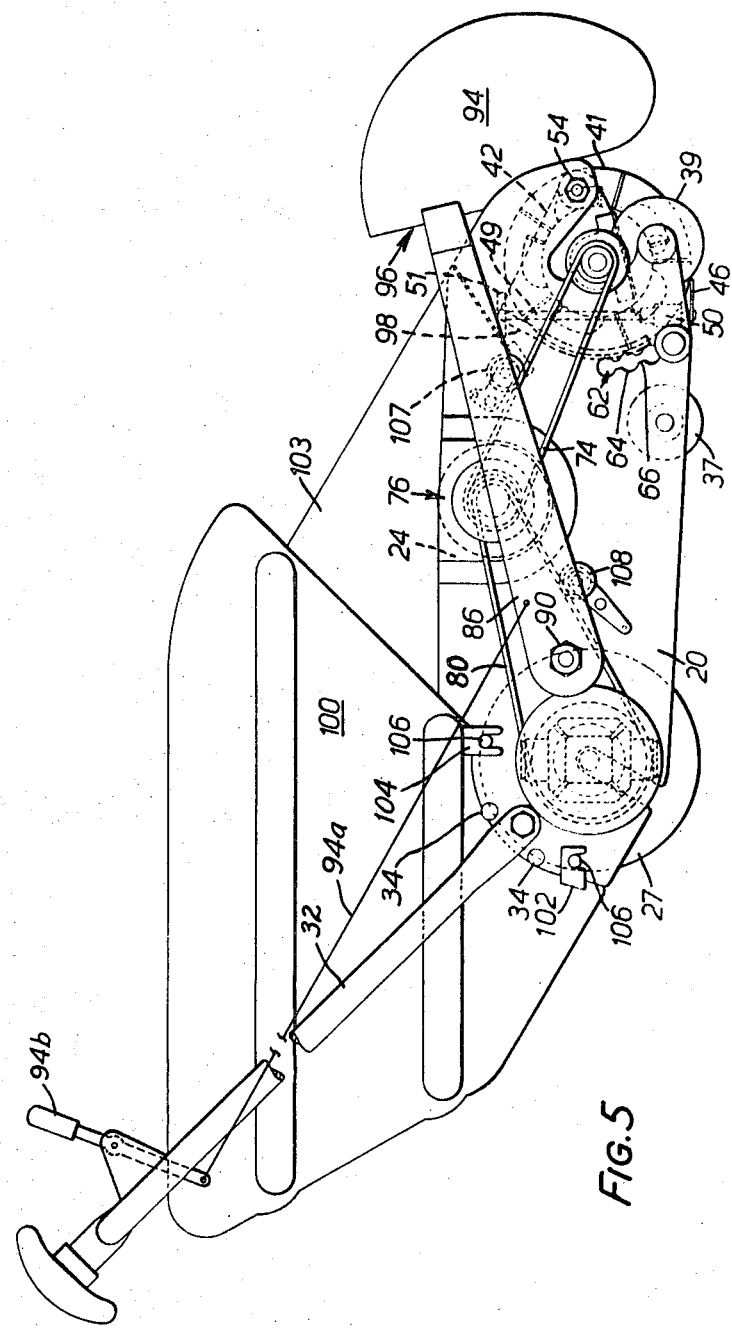
FIGURE 5 is a side elevation of a further lawn mower embodying the invention.
Figure 6:
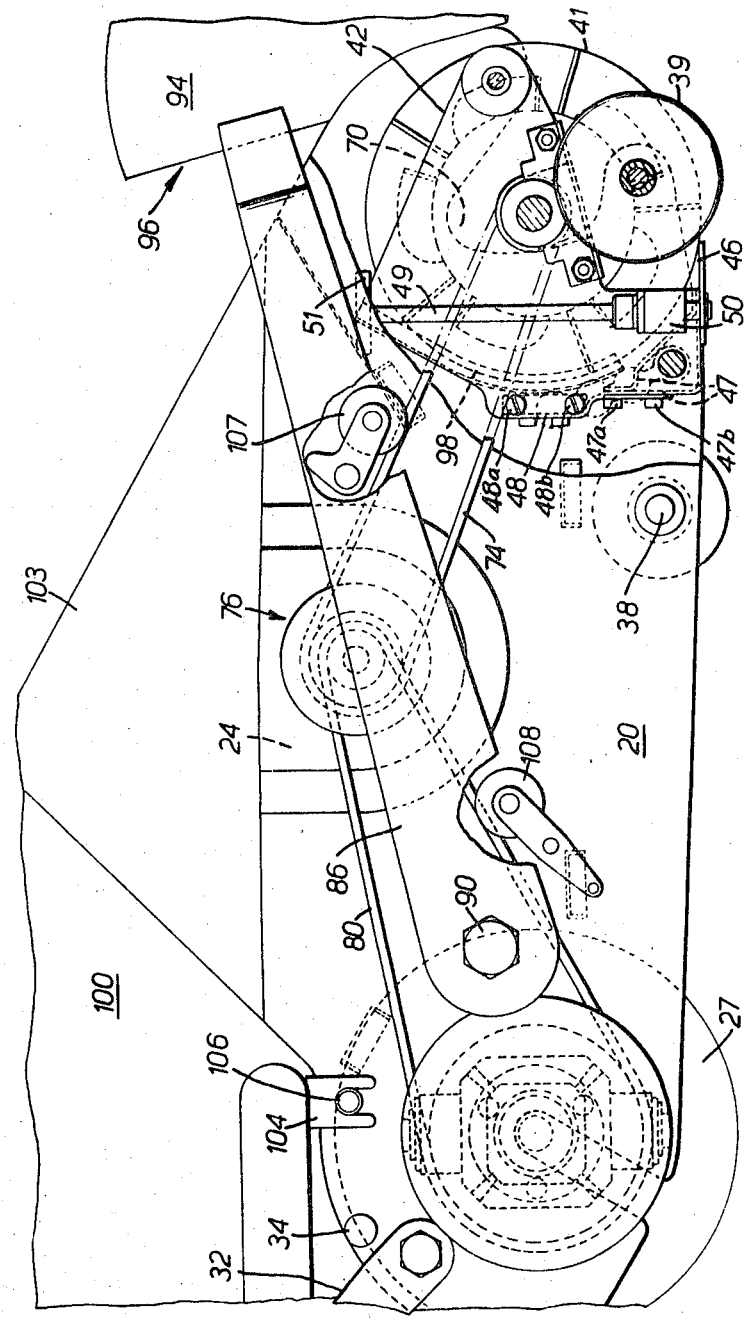
FIGURE 6 is a side elevational of part of the lawn mower of FIGURE 5, to a larger scale and with part of a frame member cutaway to show some of the mechanism more clearly.
Figure 8:
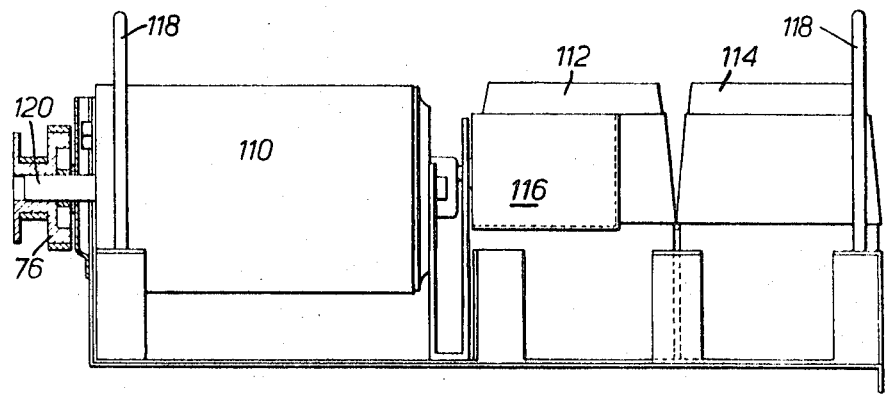
FIGURE 8 is a plan view of a motor unit for use with the mower of FIGURES 5 to 7.

FIGURE 8 shows the side elevation of a power-pack for use with the mower of FIGURES 5, 6 and 7. The power-pack comprises an electric motor 110 which is powered by two batteries 112 and 114. A constant-potential charger unit 116 is provided on the power-pack for charging the batteries 112 and 114, and the power-pack incorporates two lifting handles 118. The figure shows how the shaft 120 of the motor 110 engages the double-pulley 76 of the mower when the power-pack is positioned in the mower.

Figure 9:
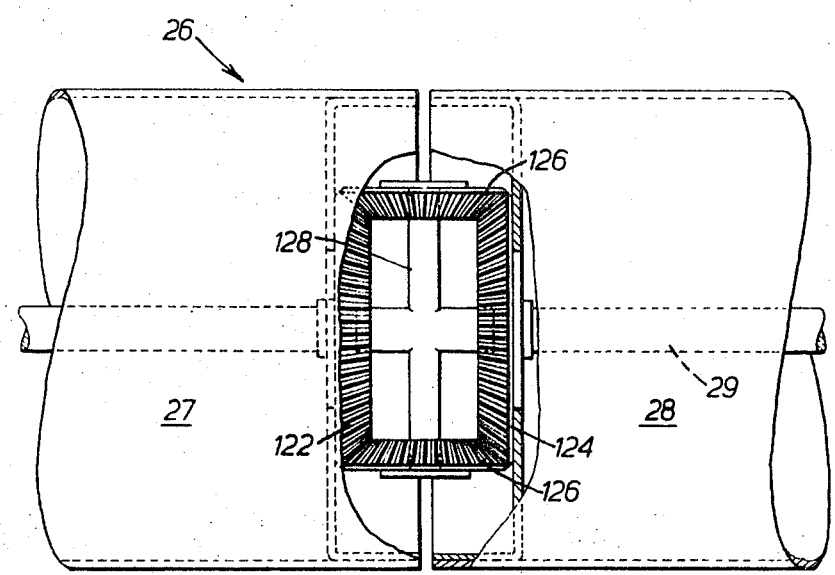
FIGURE 9 is a cut-away view of a roller assembly of the mower of FIGURES 5 to 7.

FIG. 9 shows the differential assembly coupling the two rollers 27 and 28 to provide a differential motion in the usual manner. As illustrated, bevel gears 122, 124 are journaled on the shaft 29 and fixed to the inner ends of the respective rollers 27, 28. A differential spider 128 is fixed to the shaft 29 for rotation therewith and each of its transverse arms has journaled thereon a bevel gear 126. Each gear 126 meshes with the two gears 122, 124 on the rollers permitting the rollers to rotate at different speeds in accordance with the principles of differential gearing.

In FIGURE 5, one of the side arms 86 is partially broken away to reveal belt-tensioning idler pulleys 107 and 108 respectively engaging the belts 74 and 80. If desired, hand controls (not shown) may be provided to hold each of these pulleys 107, 108 out of engagement with the belts so as to cause the belts to slip; in this way, a power-pack motor, if fitted, can be temporarily disconnected from the roller assembly 26 and/or the cutting cylinder 41.

FIGURES 10 and 11 show, diagrammatically, another lawnmower embodying the invention. The frame of the mower of FIGURES 10 and 11 is in the form of two relatively movable portions. One portion of the mower frame rotatably supports a main driving roller 205 and an idler roller 206, and comprises side members 207 and 208 and a cross member 209. Handles 210 are attached to the side member 207 and 208 by which the mower may be pushed (or guided only, if power driven).

The other portion of the mower frame comprises two side arms 212 and 213 which are respectively attached to the side members 207 and 208 so as to be pivotable about the axis of the roller 205 (or other parallel axis) as shown by the arrow G (FIGURE 10). The side arms 212, 213 are interconnected by a cross-member 214. Two side wheels 215 are rotatably mounted in the distal ends of the side arms 212 and 213 which also support a cutting cylinder 216. One or each of the side arms 212, 213 is hollow and encloses a chain (not shown), or other transmission, drivingly interconnecting the cutting cylinder 216 and the roller 205 and by means of which the cutting cylinder 216 is rotated when the mower is pushed or driven in the direction of the arrow H. A stationary cutting blade 217 is supported between the side arms 212, 213 (by means not shown) so as to be in cutting relationship with the cutting cylinder 216. It will be seen that the side arms 212, 213, together with the cross member 214, form a bogie supporting the side wheels 215 and the cutting cylinder 216, the bogie being torsionally stiff so as to resist twisting about the longitudinal axis of the mower.

Means may be provided for locking the bogie in a raised position so as to hold the cutting cylinder at a safe height above the ground for transport purposes, or for occasional cutting of abnormally long grass.

Because the bogie is only pivotable in the direction of the arrow G, the mower may be safely operated with one or each of the side wheels 215 over a gulley, the cutting cylinder 216 being supported over the ground by the torsional rigidity of the bogie. The bogie can pivot in the direction of the arrow G in response to changes in ground contour, thus maintaining the cutting cylinder 216 at the correct distance above the ground.

The construction described therefore enables the cutting cylinder 216 to be mounted at the front of the mower, hence, there is no need for a front-mounted idler roller which would tend to flatten the grass and thus reduce the effectiveness of the grass cutting process.

It will also be appreciated that the mounting of the driving roller 205 at the front end of the main frame of the mower has the advantage that weight is transferred onto the driving roller when the mower is pushed. With the arrangement illustrated in FIGURES 10 and 11, the or each driving chain will also tend to transfer some weight onto the bogie as the mower is pushed. This effect, which in any case is small, can be reduced by suitable adjustment of the gear ratio between the driving roller 205 and the cutting cylinder 216 and the distance between them. The effect can be eliminated by using a different type of driving connection between the roller 205 and the cutting cylinder 216.

Means may be provided on the bogie by which the position of the cutting cylinder 216 and the stationary blade 217 relative to the side wheels 215 can be altered to adjust the height of the cut.

An idler roller or slide beneath cutting blade 217 may be used with, or instead of, sidewheels 215 to maintain a minimum cutting height.

The cutting cylinder 216 and the stationary cutting blade 217 may be replaced by a rotary blade assembly rotatable about a substantially vertical axis when the bogie is in the position illustrated.

The grass cut by the cutting cylinder 216 of the mower of FIGURES 10 and 11 may be colletced by a grass box (not shown) removably mounted on the side members 212 and 213. FIGURE 12 shows another way in which grass cut by the mower of FIGURES 10 and 11 may be collected. FIGURE 12 is a cross-section of the mower of FIGURES 10 and 11 (taken on the line XII–XII of FIGURE 11) and shows the mower as carrying two grass receptacles. A small grass receptacle 220 is mounted on the bogie comprising the side members 212 and 213 and the cross-member 214. An open-topped grass box 221 of considerably larger capacity than the receptacle 220 is mounted on the cross-member 209. The rear side of the grass box, that is, the side nearest the handle 210, is cut away so as to be lower than the remaining three sides of the grass box. The grass box has a lid 222 which is pivoted on an axis 223 to the top of the rear side of the grass box. The lid 222 is biased by a tension spring 224, attached to the handle 210, into the substantially vertical position illustrated in the drawing in the full line. The lid, however, may be manually depressed against the tension of the spring, so as to assume the horizontal position shown dotted in the drawing, the lid being so shaped that it then lies level with the top of the cut-away rear side of the grass box 221.

In use, grass clippings cut by shearing action between the cutting cylinder 216 and the stationary blade 217 are thrown up in the direction of the arrow J and fall into the receptacle 220. When the receptacle 220 is full, the bogie may be manually lifted, pivoting about the axis of the roller 205 so that the grass clippings fall from the receptable 220 into the grass box 221, the lid 222 of the latter being in the raised position. When the grass box 221 is nearly full of clippings, the lid 222 may be depressed by the operator against the action of the spring 224 so as to assume the position shown dotted, thus compressing the grass clippings in the grass box. Therefore, when the lid 222 is allowed to rise again to its substantially vertical position under the action of the spring 224, the grass box 221 is ready to receive further clippings. The end of the lid 222 near the pivot 223 prevents the clippings in the grass box 221 from falling out of the grass box over the cut-away rear side when the lid is in the raised position.

The lid 222 can be moved into its horizontal position by direct hand or foot operation, or by linkage mounted, for example, on the handle 210 such a cord 225 and a pivotable lever 226. The spring 224 may be dispensed with and, instead, a flexible strip of material acting both as a hinge at the pivot 223, and as a torsional spring biasing the lid into the raised position, may be used.

It will be appreciated that the lid 222 and its associated spring, hinge and operating linkage may be dispensed with if not desired.

The grass box 100 of the mower of FIGURES 5 to 7 may be arranged to be constructed similarly to box 221 (FIGURE 12) and may incorporate a depressible lid, corresponding to lid 222, with associated spring and operating linkage.

In a mower having a single grass box, such as the grass box mounted at the front end of known roller or side wheel-type lawn mowers, or sometimes at the rear end of side wheel-type lawn mowers, one of the sides of the box (preferably the curved side, normally provided in such a box, against which the grass clippings are thrown) may be modified so as to be movable directly, or through a linkage, against the action of spring means, so as to compress the grass clippings into the lowest part of the box.

Figure 13:
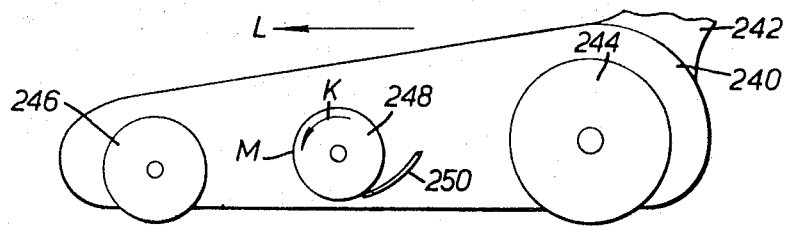
FIGURE 13 is a diagrammatic cross-section through a conventional lawn mower; illustrating certain grass-cutting principles.

Another mower embodying the invention will now be described with reference to FIGURES 13 and 14. FIGURE 13 shows, diagrammatically, a conventional lawn mower having a frame comprising two side members (only one, referenced 240, being shown) with a handle 242 attached thereto, the frame rotatably supporting a main rear roller 244, a front roller 246, and a cutting cylinder 248, the latter being drivingly connected by means not shown to the main roller 244 and rotating in the direction of arrow K in cutting relationship with a stationary blade 250 when the mower moves in the direction of arrow L. The cutting cylinder 248 comprises, in known fashion, a pair of axially spaced end plates supporting a number of twisted cutting blades arranged vertically along the periphery of the cylinder.

As is well known, when such a mower is pushed or driven in direction of the arrow K, the grass to be cut is collected by the blades of the cutting cylinder 248 and cut by shearing action between these blades and the stationary blade 250. It will be apparent that, in order to obtain reliable shearing action, it is essential that grass should not be pushed forward by the cutting cylinder. If the grass is pushed forward, it will either pass under the stationary blade 250 and thus not be cut at all, or it will be cut at the incorrect height. In order to prevent this happening, that one of the blades of the cutting cylinder 248 which is gathering the grass at any given time should not be moving forward at the time when it is in contact with the grass and should only be moving downwards and backwards (that is, against the direction of the mower motion). The velocity of the blades of the cutting cylinder 248, relative to the grass, is compounded of the forward velocity of the mower and the peripheral rotational velocity of the cutting cylinder 248. The velocity of any given blade on the cutting cylinder 248 can only be in a backward direction when the blade has at least reached some point which is below the height of the centre of the cylinder 248 and, of course, if the peripheral velocity of the cylinder is insufficient, the blade will never move backwards. The position of the point at which a blade starts to move backwards depends on the relative magnitude of the forward velocity of the mower and the peripheral rotational velocity of the cylinder; therefore, the position of this point is dependent on the radius of the cutting cylinder 248 and the gear ratio between the driving roller 244 and the cutting cylinder 248. However, it will be seen that the position of the point can be no higher than the intersection M of the horizontal diameter of the cutting cylinder 248 and the periphery of the cylinder as shown in FIGURE 13. Therefore, the law mower cannot reliably cut grass which is higher than the point M and hence cannot reliably reduce the height of grass by more than the radius of the cylinder 248. It may also cut each piece of grass several times in reducing it to the correct height.

In practice, the lawn mower of FIGURE 13 can in fact cut grass which is higher than the point M. Such grass may be gathered by a blade of the cylinder 248 when it is higher than the point M, provided that no other blade of the cylinder 248 is in front of and below the gathering blade. This method of gathering grass for cutting is unreliable. Furthermore, it requires a cutting cylinder with few blades. In addition, the grass gathered may be pushed forward by the stationary blade 250 before it is cut; it is therefore likely that the grass will be cut to an incorrect height and the lawn will be given a ragged appearance.

Figure 14:
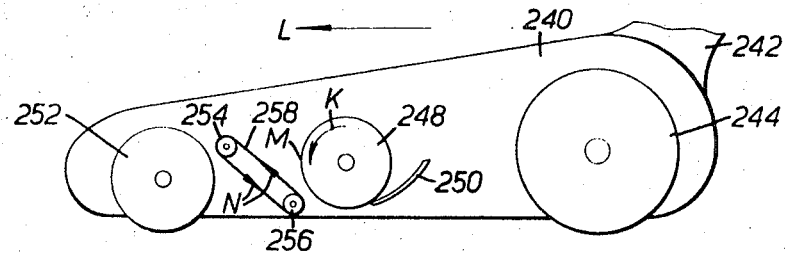
FIGURE 14 is a diagrammatic cross-section through yet another lawn mower embodying the invention whose operation is explained with the aid of FIGURE 13.

The mower of FIGURE 14 is similar to the mower of FIGURE 13 in that it has the main roller 244, the cutting cylinder 248, and the fixed blade supported in the frame. However, the small diameter roller 246 of the mower of FIGURE 13 is replaced, in the mower of FIGURE 2, by two side wheels 252 (only one visible) attached to the frame of the mower. Two rollers 254, 256, are also mounted on the frame of the mower, by means not shown, and extend across the full width of the mower. An endless band 258, of flexible material, and also extending across the full width of the mower, is fitted over the rollers 254 and 256. When the mower is pushed or driven in the direction of the arrow L, the rollers 254 and 256 are caused to rotate, by means not shown, so as to drive the endless band 258 in the direction of arrows N. The surface of the band 258 is roughened by being serrated, or is otherwise arranged to catch the tips of the grass.

In use, the moving surface of the band 258 catches the tips of tall grass as the mower moves in the direction of the arrow L, and compresses this grass in front of the cylinder 248 without pushing the grass over. As the mower continues to move forwards, the compressed grass passes under the roller 256 and springs up into the cylindrical spaced defined by the periphery of the cylinder 248. The blades of the cutting cylinder 248 are not, therefore, involved in the grass gathering process and are only used to force the grass against the fixed blade 250 to complete the cutting operation.

It will therefore be apparent that a lawn mower as shown in FIGURE 14, makes possible reliable and even cutting of grass, with less cuts on each piece of grass than with conventional gathering. The rollers 254, 256 and the endless band 258 shown in FIGURE 14 may be used in the mowers illustrated in the previous figures.

Figure 15:
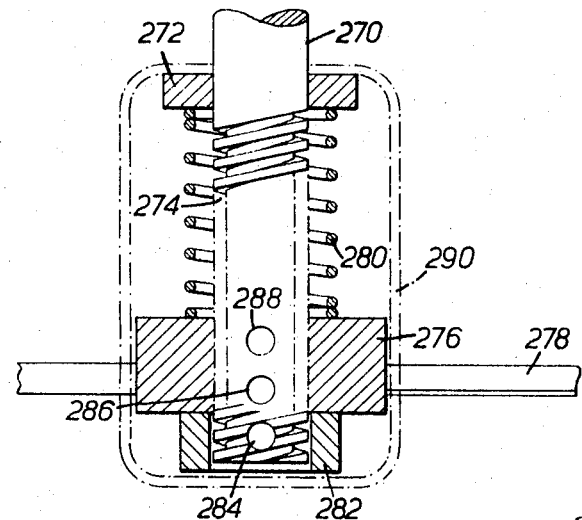
FIGURES 15, 16 and 17 show details of automatic height adjustment mechanisms according to a feature of the invention.
Figure 17:
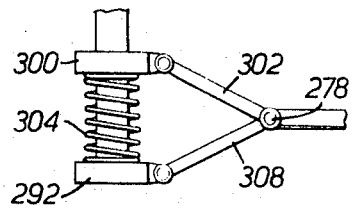
Figure 16:
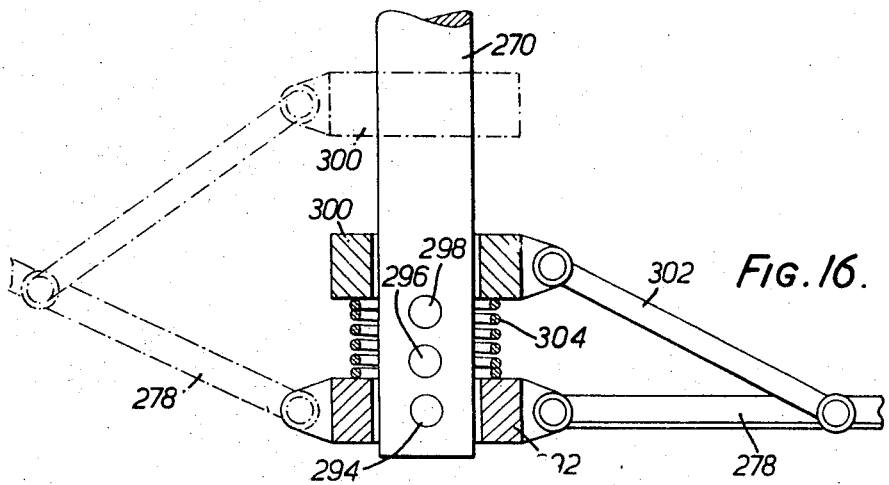

FIGURES 15, 16 and 17 illustrate a further feature of the invention for application to a power mower, either incorporating a rotary cutting blade or blades or a cutting cylinder. FIGURE 15 shows the drive shaft 270 of a mower of the rotary type, the shaft 270 being driven by, for example, an electric motor or an internal combustion engine. The shaft 270 has a flange 272 rigidly attached to it, and the portion of the shaft below the flange 272 is provided with a multi-start thread 274 which engages a correspondingly threaded nut 276 from which project the rotary blades 278. A compression spring 280 on the shaft 270 acts between flange 272 and nut 276 thus urging the latter towards the lower end of the multi-start thread 274. The lowest position which the nut 276 can assume is fixed by a collar 282 which is attached to the shaft 270 by means of a pin (not shown) passing through the collar and through a hole 284 in the shaft 270.

In operation, the nut 276 tends to rise up the shaft when the blades 278 encounter grass. The spring 280, however, normally maintains the nut 276 at its lowest position against collar 282 where it rotates carrying the blades 278 with it so as to perform grass cutting.

If, however, the blades 282 encounter grass whose toughness (due, for example, to its length, thickness or moisture content) is such that it cannot be satisfactorily cut at the height fixed by the collar 282, the torque exerted by the grass on the blades 278 increases to such an extent as to overcome the downward force exerted by the spring 280. The nut 276, therefore, rises up the shaft 270 along the multi-start thread 274 to an extent determined by the torque exerted by the grass on the blades 278. The height of cut is, therefore, automatically increased so that overloading (and, in the case of an internal combustion engine, stalling) of the mower motor by the tough grass is prevented.

The spring 280 preferably has a low rate and is arranged to provide an axial load which is sufficient to balance the upward axial force exerted on the nut 276 when the motor is approaching its maximum torque. Therefore, the nut 276 will commence to rise up the shaft 270 against the force of the spring 280 when the cutting torque (that is, the torque exerted on the blades 278 by the grass being cut) approachces a value equal to the maximum engine torque.

The normal height of cut (that is, the height of cut taken on grass within the capabilities of the motor torque) is fixed according to the position of the collar 282, and can, therefore, be adjusted by adjusting the position of the collar 282 on the shaft. As shown, holes 286 and 288 are provided in the shaft 270, and the pin securing the collar 282 can be positioned in either of these holes, instead of the hole 284, to secure the collar and thus to provide different heights of cut as required.

The multi-start thread 274 may be replaced by a helical groove, in which case the bore of the nut 276 would not be threaded but would carry an inwardly projecting pin adapted to engage the groove.

The arrangement may be enclosed in a flexible rubber cover 290 if desired.

In the embodiment of FIGURE 16, the drive shaft 270 carries a blade carrier 292 which is attached to the shaft by means of a pin (not shown) inserted through the carrier 292 and one of three holes 294, 296, 298 in the shaft. The blade carrier carries the blades 278. In contrast to the embodiment of FIGURE 15, in which the blades 278 are rigidly attached to the nut 276, the blades 278 in the embodiment of FIGURE 16 are hingedly attached to the carrier 292 so as to be pivotable in vertical planes. A collar 300, freely slideable on the shaft 270, carries a number of links 302 (only one being shown), which are pivotable on the collar 300 in vertical planes and which are pivotally attached to the blades 278. A compression spring 304 on the shaft 270 acts between the carrier 292 and the collar 300.

In operation, the shaft 270 is driven by the mower motor and carries the blade carrier 292 with it. The effect of centrifugal force on the blades 278 is sufficient to cause the blades to assume a substantially horizontal cutting position, the collar 300 being pulled down the shaft 270 by the links 302, thus compressing the spring 302. If the blades 278 encounter grass tougher than can be cut by the motor when developing maximum torque, the increased cutting torque exerted on the blades 278 by the grass reduces the speed of the shaft 270 and thus reduces the centrifugal force acting on the blades. The spring 304 therefore urges the collar 300 upwardly as shown in dotted form in FIGURE 16, the links 302 pulling the blades 278 upwardly as indicated and thus increasing the cutting height. The torque required from the motor is therefore reduced, preventing overloading or stalling of the motor.

FIGURE 17 shows a modification of the embodiment of FIGURE 16 in which the blades are not directly connected to the blade carrier 292, but are connected thereto through the intermediary of links 308 which are pivotable in vertical planes on the carrier 292. The links 302 and 308 are so pivotally connected to the blades 278 that the blades are maintained substantially horizontal at all times; that is, they remain horizontal when drawn up the shaft by the collar 300. The operation of the arrangement is otherwise the same as that of the embodiment of FIGURE 16.

The embodiments of FIGURES 16 and 17 may, like the embodiment of FIGURE 15, be enclosed in a flexible rubber cover, provided, if necessary, with slots for allowing movement of the links.

The normal cutting height of the embodiments of FIGURES 16 and 17, is adjusted by altering the position of the blade carrier 292 on the shaft 270 and securing it in its new position by inserting the fixing pin (not shown) through the appropriate one of the holes 294, 296, 298.

In a cylinder-type mower, such as those of FIGURES 1 to 14, a device, sensitive to the cutting torque applied by the grass to the cutting cylinder in such a mower, may be arranged to adjust the cutting height automatically by raising the cutting cylinder relative to the support wheels or rollers when grass tougher than that which can be cut at the normal cutting height is encountered. Instead, an arrangement sensitive to the rotational speed of the cutting cylinder could be used to increase the cutting height automatically if the speed of the cutting cylinder fell due to its encountering the tougher grass. For example, a collar, slideable along the cutting cylinder shaft against a spring under the action of centrifugal force, could be arranged to adjust the position of the support wheels or roller on the mower chassis by means of a bell crank or other suitable linkage. With mowers modified in this way, as with the mowers of FIGURES 15, 16 and 17, there is less need for frequent adjustment of the desired height of cut. Once the desired height of cut is set, by appropriate positioning of the nut 276 (FIGURE 15) or the blade carrier 292 (FIGURES 16 and 17), on the shaft 270 (and by any other adjustment provided on the mower), any variation in grass height would be automatically accommodated within the limitations imposed by the motor power available.

Figure 18:
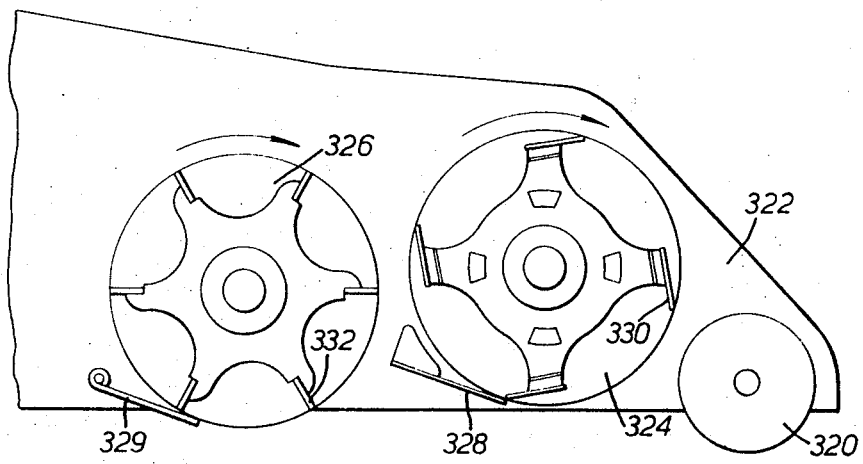
FIGURE 18 is a diagrammatic cross-section through part of a lawn mower illustrating a further feature of the invention.

FIGURE 18 shows, diagrammatically, a further modification according to the invention. The figure is a cross-section through part of a mower and illustrates a front support roller 320 rotatably mounted in a frame 322 together with two cutting cylinders 324 and 326. The cutting cylinders 324 and 326 are respectively rotatable in cutting relationship with stationary blades 328 and 329 and are drivingly connected by means not shown to a rear roller, also not shown. One cylinder, the cylinder 324, is adapted to cut long grass as the mower moves in the direction of arrow P, while the other cylinder, the cylinder 326, is adapted to cut shorter grass, the cylinder 324 being arranged to cut long grass to such a height that, if desired, the grass can be cut shorter by the cylinder 326.

The cylinder 324 for cutting the long grass comprises four cutting blades 330 mounted on the cylinder with their cutting edges extending parallel to the axis of rotation. Each cutting blade 330 is made sufficiently thin and of appropriate material to give it some flexibility and is so mounted as to allow the cutting edge some movement as a result of this flexibility when it comes opposite the stationary cutting blade 328. The cutting blades 330 may, for example, be made from thin tempered steel strip and their flexibility reduces the likelihood of jamming by thick long grass. The angle of mounting of the cutting blades 330 and the separation therebetween, facilitates engagement of the cutting edge with long grass or like vegetable matter and the cutting thereof when the blade comes adjacent the stationary cutting plate blade 328.

The cutting cylinder 326 for the shorter grass is of conventional design having as many as six or more cutting blades 332 and is normally mounted near the ground than the other cylinder 324.

The cutting cylinders of FIGURE 18 may be used in any of the mowers of FIGURES 1 to 14 in place of the single cutting cylinder shown. Preferably, means are provided to enable disconnection of the driving connection to either cylinder 324, 326, and preferably the height of each cylinder above the ground may be adjusted independently. It will be understood that, when only a coarse cut of long grass is required, only the cylinder 324 will be driven whilst only cylinder 326 will be driven when only short grass is to be cut.

The mowers described may have a foot control for adjusting the height of cut.

I claim:
1. A lawn mower comprising:
   a frame including two side members,
   ground-engaging roller means rotatably supported on the said frame between the said side member,
   a stationary cutting blade mounted on the said frame between the said side members and adjacent the ground,
   a cutting cylinder mounted on the said frame between the said side members for rotation in cutting relationship with the said stationary cutting blade as the mower is moved in a forward direction,
   an open-topped first grass box removably mounted on the said frame above the said roller means,
   a pair of support arms each pivoted at one end to a respective said side member of the said frame, and
   a second grass box rigidly supported between and by the said support arms whereby the said support arms are pivotable on the said frame between a first position in which the said second grass box receives grass cut by the said cutting cylinder, and a second position in which the said second grass box is substantially above the said first grass box whereby cut grass in the said second box falls therefrom into the said first box.

2. A lawn mower according to claim 1, including linkage movably mounted on the said frame and connected to the said support arms for moving the said second grass box between its two said positions.

References Cited
UNITED STATES PATENTS

| 669,437 | 3/1901 | Coldwell | 56—26 |
| 2,660,018 | 11/1953 | Clemson | 56—26 |
| 2,859,580 | 11/1958 | Salamy | 56—26 |
| 3,099,122 | 7/1963 | Sakatani | 56—202 X |
| 3,304,701 | 2/1967 | Jackson | 56—252 X |

LOUIS G. MANCENE, Primary Examiner

PASQUALE A. RAZZANO, Assistant Examiner